Nov. 1, 1932.   B. F. WILSON   1,885,571
AEROPLANE
Filed Sept. 4, 1931   2 Sheets-Sheet 1
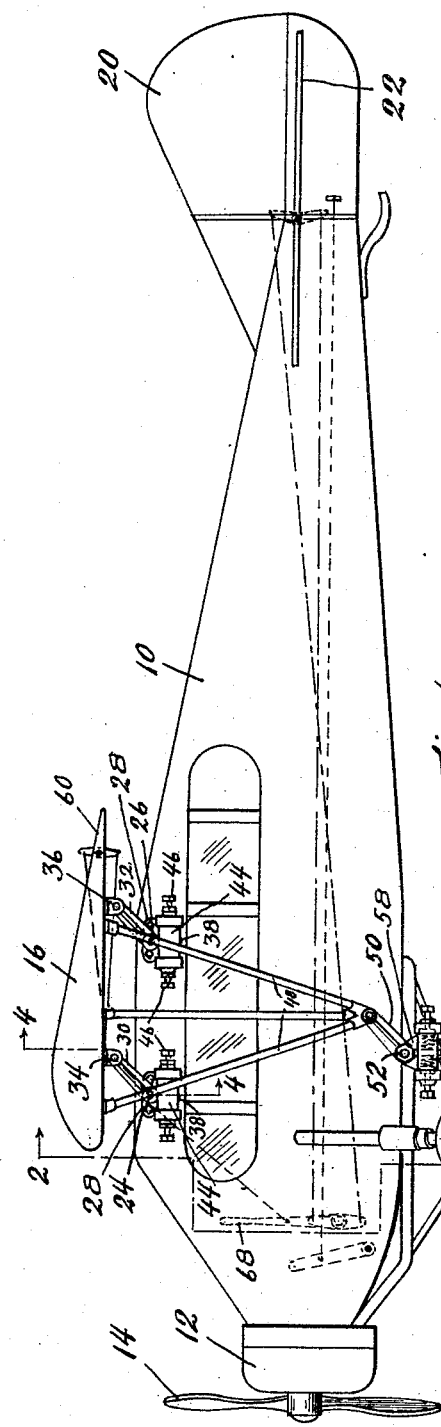
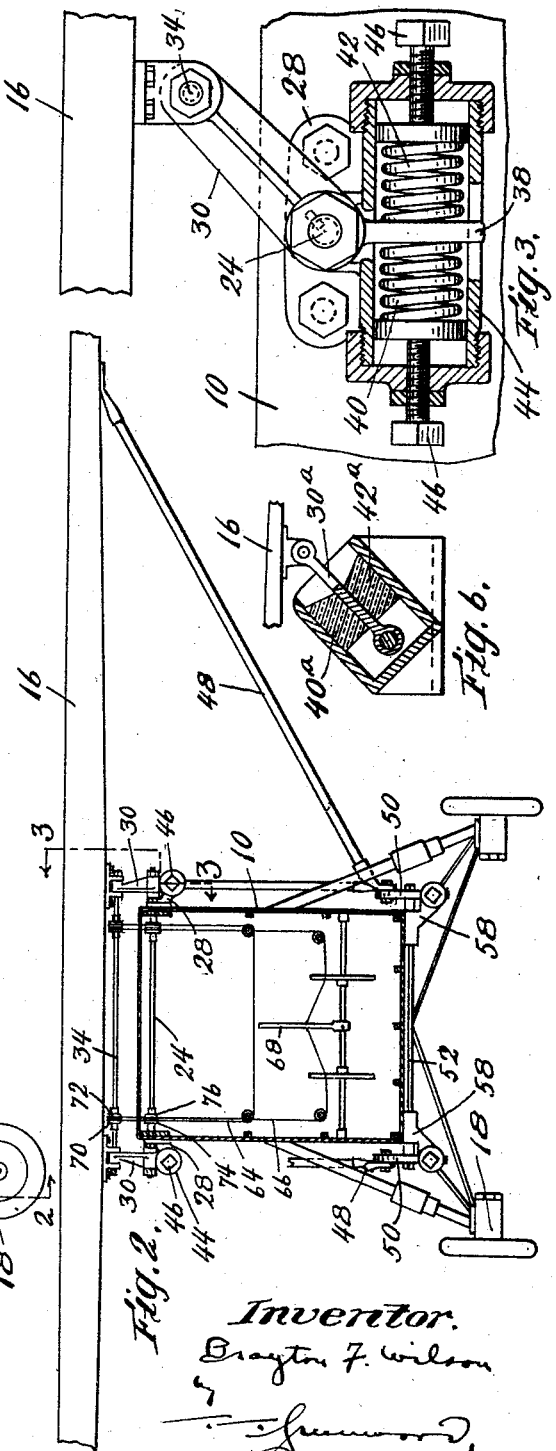
Inventor.
Brayton F. Wilson Patented Nov. 1, 1932

1,885,571

UNITED STATES PATENT OFFICE

BRAYTON F. WILSON, OF CAMBRIDGE, MASSACHUSETTS

AEROPLANE

Application filed September 4, 1931. Serial No. 560,907.

This invention relates to aeroplanes.

When the aeroplane is in flight the weight of the body, engines, and passengers is supported entirely by the wings. The air through which the plane passes has localities of different density and the speed of the plane is fast so that the plane passes into and out of localities of different densities rapidly. Thus the wings or supporting surfaces are subjected to sudden variations of pressure which impose sudden variation of strains on the wing structures and their connections with the body or fuselage.

The wings or supporting surfaces and their connections with the body are also subjected to severe strains and particularly sudden changes of strain when the aeroplane suddenly changes its direction of advance, as in "stunt" flying, due to the fact that the body is heavy compared with and is a dead load on the supporting surfaces. The wings and their connections with the body are also under constant harmful vibration due to the operation of the engines and propellers, which vibrations may at times be quickly dangerous due to engine and propeller difficulties.

It is an object of the present invention to reduce the strains on the wings of the aeroplane and on the connections between the wings and the body, and also to absorb the transmission of harmful vibrations to these parts, by the interposition of yielding shock-absorbing connections between the wings and the body so that the wings and body can yield relatively to each other at times of sudden variations of pressure on the wings and thereby reduce the strains on the wings and the connections between them and the body.

A further object of the invention consists in supporting the body from the wings through the interposition of resilient means as springs which will permit the wings to move in a vertical direction relative to the body when subjected to sudden variations of air pressure and also to sudden variations of apparant weight of the body due to sudden changes in the rate of movement of the body such as are caused by landing or by centrifugal force.

A further object of the invention is the provision of a resilient connection between the wings and the body, which connection is so arranged that the wings can move in a vertical direction relative to the body while being constrained to move in parallel lines. That is to say, the connection is such that the wings as a unit can yield vertically but without changing their angle of attack or their lateral inclination.

Another object of the invention is the provision of a resilient connection between the wings and the body of an aeroplane and connections between the controlling surfaces carried by the wings and the control device located in the body, such that a change in the relative position between the wings and the body does not influence the setting of the controlling surfaces.

A further object of the invention is generally to improve the construction and operation of aeroplanes.

Fig. 1 is a front elevation of an aeroplane of the monoplane type embodying the present invention.

Fig. 2 is a section taken along line 2—2 of Fig. 1.

Fig. 3 is an enlarged sectional detail taken along line 3—3 of Fig. 2.

Fig. 6 is a modified form of resilient connection between the wing and body.

Figure 4:
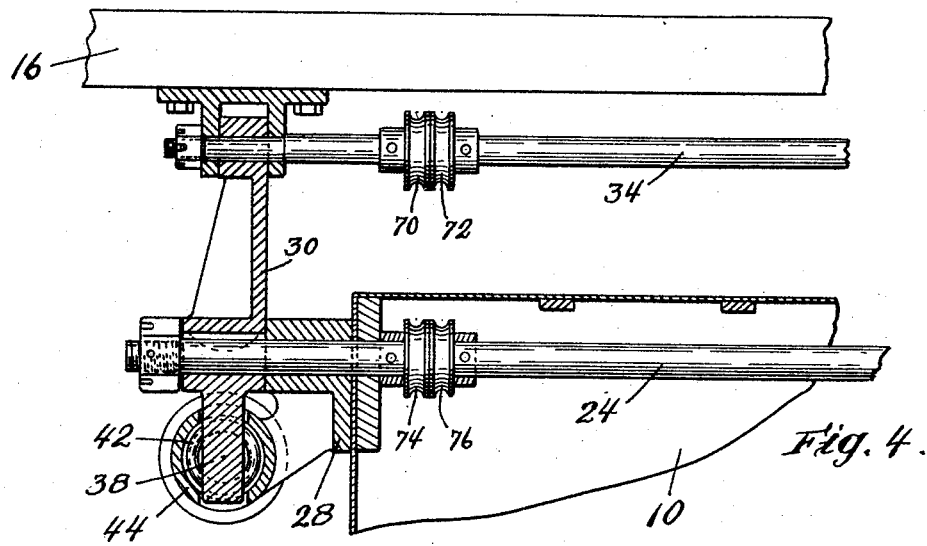
Fig. 4 is an enlarged sectional detail taken along line 4—4 of Fig. 1.

The aeroplane here shown for the purpose of illustrating the present invention is of the monoplane type and comprises the cabin type body or fuselage 10 having the tractor type engine 12 and propeller 14 and the overhead wing or supporting surfaces 16. The fuselage has the usual landing gear 18, rudder 20, and elevator 22. In accordance with the present invention, the wing 16 is resiliently connected with the body 10 so that the wing and the body can momentarily assume various displaced positions to absorb shocks and strains on the parts. The resilient connection is such that the wing moves in parallel lines without changing its angle of attack and without the tilting of the wing to one side or the other. The connection between the wing and the plane can comprise front and rear parallel supporting rods 24 and 26 which are extended horizontally through the top of and are journalled in brackets 28 fixed to and here shown as located exteriorly of the body. Arms 30 are fixed to the ends of rod 24 and similar arms 32 are fixed to the ends of the rear rod 26. Said arms are normally inclined rearwardly about forty-five degrees and are parallel to each other. The forward arms 30 are pivoted on a rod 34 carried by the wing 16 on the lower face thereof near the entering edge. The rear arms 32 are pivoted on a rod 36 which also is secured to the lower face of the wing near the trailing edge thereof. The arrangement of the rods and the arms is such as to form parallelograms on opposite sides of the body, which parallelograms are rigid with each other, the arms 30 and 32 being keyed or otherwise fixed against rotation to their respective shafts 24 and 26. Thus the wing 16 can move in a vertical direction but can neither change its angle of attack or its lateral disposition. The arms 30 and 32 are provided with depending ears 38 which are located between the compressed helical springs 40 and 42, see especially Fig. 3. Said pairs of springs are each retained in a tubular barrel 44 of a bracket 28 and the amount of compression of the springs can be varied by the adjusting screws 46. With this arrangement relative movement between the wing and the body causes the compression of one or the other of the pair of springs and said springs absorb the shock due to a sudden change of position between the wing and the body and thus reduce the strains on both. The springs also return the wing and body to their respective normal positions when load conditions become normal.

The wing is connected to the body, on opposite sides thereof, by struts or guy members 48. The lower end of each strut is connected to an arm 50 similar to an arm 30, which arm 50 is fixed to a cross rod 52 similar to a cross rod 24 or 26 and is acted upon by springs 54 and 56 in the bracket 58 carried by the body. The arms 50 on opposite sides of the body preferably are connected rigidly to the rod 52 and are parallel with the arms 30 and 32 so that the connections with all of said arms comprise parallelograms that permit relative movement between the wing and the body in parallel lines only.

Fig. 6 illustrates a modified form of resilient connection between the wing and the body. In this construction an arm 30a, similar to an arm 30, is located between opposed resilient blocks of rubber 40a and 42a. Said rubber blocks function in the manner described in connection with the springs 40 and 42. This construction has an advantage for certain purposes in that the rubber blocks are quicker in action and are more sensitive than the springs 40 and 42 to absorb the shock and vibration.

Figure 5:
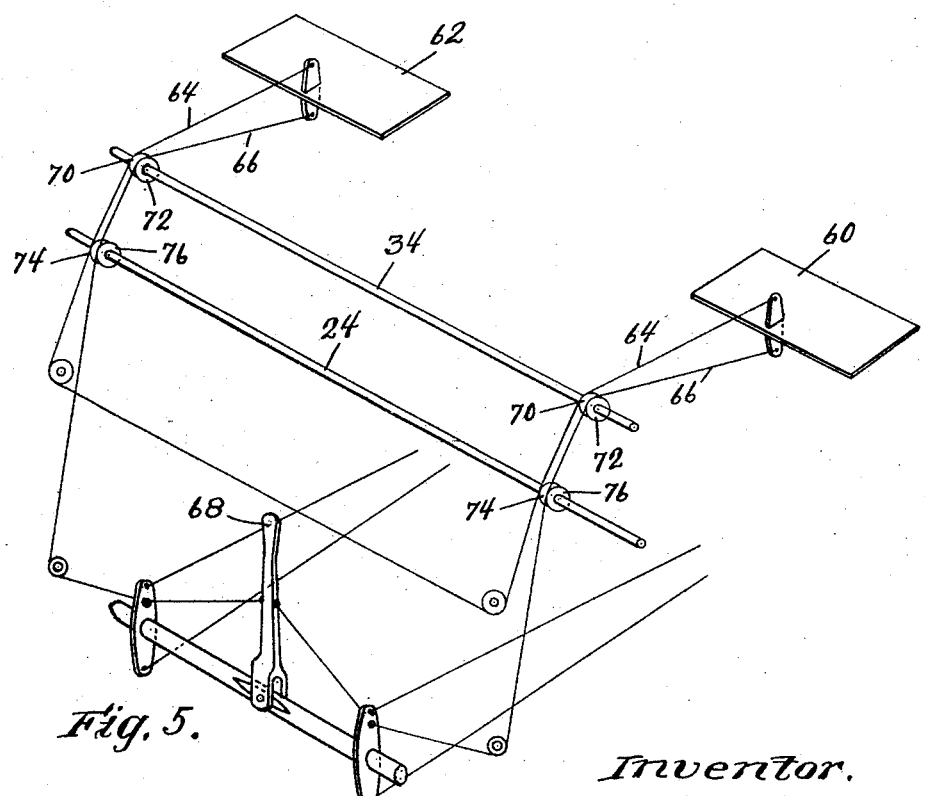
Fig. 5 is a diagrammatic view of the connection between the ailerons carried by the wing and the control stick carried by the body or fuselage.

The wing 16 is provided with the usual ailerons 60 and 62, see especially Figs. 1 and 5, at the trailing edges of the wing. Said ailerons are connected through cables 64 and 66 to a control stick 68 carried by the body. In accordance with this invention, the connection between the control stick and the ailerons is such that the positions of the ailerons are unaffected by relative movement between the wing and the body. To this end the control cables 64 and 66 are caused to pass from the wing to the body over rollers 70 and 72 journalled on the front cross rod 34 of the wing and over other rollers 74 and 76 journalled on the front and parallel cross rod 24 of the body. With this arrangement the length of the cables between the wing and the body is not altered regardless of changes in distance between the wing and the body and hence the control of the aeroplane is not affected by the resilient movable connection between the body and the wing.

The construction may be otherwise modified without departing from the spirit of the invention.

I claim:

1. An aeroplane comprising a body, a supporting surface therefor, a yielding connection between said supporting surface and body comprising a system of parallel linkages which constrains said supporting surface to move relative to said body in parallel lines only, and elastic means included in said connection and which opposes movement between said body and surface and absorbs the shocks transmitted between said body and surface.

2. An aeroplane comprising a body, a supporting surface therefor, and a yieldable resilient connection between said body and supporting surface, said connection comprising a linkage system which effects the vertical displacement of said supporting surface with respect to said body and constrains said supporting surface against change of angle of attack and lateral inclination during such movement, and elastic means which absorbs shocks due to changes in stresses between said body and surface caused by a variable air pressure on said supporting surface.

3. An aeroplane comprising a body, a supporting surface therefor, a system of linkages connecting both the front and the trailing edges of said supporting surface with said body so that said entire surface can assume various vertical positions with respect to said body when subjected to a variable air pressure, and elastic means which absorbs the shock transmitted between said surface and body due to a variable air pressure.

4. An aeroplane comprising a body, a supporting surface therefor, and yielding means connecting said body and supporting surface so that the vertical distance therebetween can vary in response to varying air pressure on said surface, said yielding means including parallelogram linkages which constrain said supporting surface for displacement in parallel lines and elastic shock-absorbing means interposed between said linkages and body which yieldingly opposes the movement of said linkages.

5. An aeroplane comprising a body, a supporting surface therefor, yielding means connecting said body and surface so that the vertical distance therebetween can vary in response to varying air pressure on said surface, said yielding means including parallelogram linkages connected between said body and surface on opposite sides of said body, and means connecting said parallelogram linkages for conjoint operation, and elastic means connecting said linkages and said body to prevent transmission of shocks between said surface and said body.

6. An aeroplane comprising a body, a supporting surface therefor, yielding means connecting said body and surface so that the vertical distance therebetween can vary in response to varying air pressure on said surface, said yielding means including parallelogram linkages connected between said body and surface on opposite sides of said body, means connecting said parallelogram linkages for conjoint operation, and resilient means opposing movement of said linkages and absorbing shocks due to changes of pressure on said surface.

7. An aeroplane comprising a body, a supporting surface therefor, yielding means connecting said body and surface so that the vertical distance therebetween can vary in response to varying air pressure on said surface, said yielding means including parallelogram linkages connected between said body and surface on opposite sides of said body, means connecting said parallelogram linkages for conjoint operation, and resilient means opposing movement of said linkages in opposite directions and absorbing shocks due to changes of pressure on said surface.

8. An aeroplane comprising a body, a supporting surface therefor, yielding means connecting said body and supporting surface, a control surface carried by said supporting surface, an actuating member for said control surface carried by said body, and means connecting said actuating member and control surface which is of constant extent regardless of change of relative position between said body and said supporting surface.

9. An aeroplane comprising a body, a supporting surface therefor, a yielding connection between said body and supporting surface, a control surface carried by said supporting surface, an actuating member for said control surface carried by said body, and means connecting said actuating member and said control surface by which the setting of said control surface by said actuating member is independent of changes of position between said supporting surface and said body.

10. An aeroplane comprising a body, a supporting surface therefor, means yieldingly connecting said body and supporting surface comprising parallelogram linkages pivotally connected both with said supporting surfaces and said body, a control surface carried by said supporting surface, an actuating member for said control surface passed between said supporting surface and said body in parallel relation with the links of said parallelogram linkages whereby the setting of said control surface is independent of change of distance between said supporting surface and said body.

11. An aeroplane comprising a body, a supporting wing therefor, a shock-absorbing connection between said body and wing, a guy-member connected between said body and wing, a shock-absorbing member in said guy-member connection and means constraining both said shock-absorbing and guy-member connections to move in unison by the same amount.

12. An aeroplane comprising a body, a supporting wing therefor, shock-absorbing connections including parallelogram linkages connecting said body and wing, a guy-member connected between said body and wing, and a shock-absorbing member including a link parallel with said parallelogram linkages in said guy-member connection.

In testimony whereof, I have signed my name to this specification.

BRAYTON F. WILSON.